Aug. 19, 1952 — M. H. PETERSON — 2,607,241
SAFETY GUARD FOR DRIVING CONNECTION MECHANISM
Filed March 21, 1949
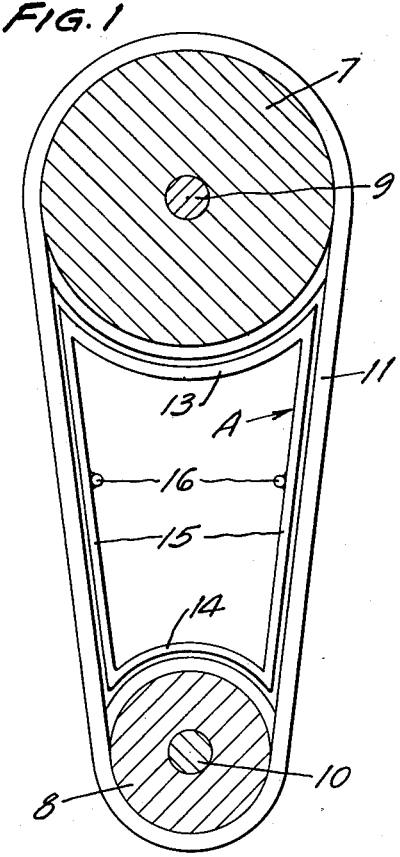
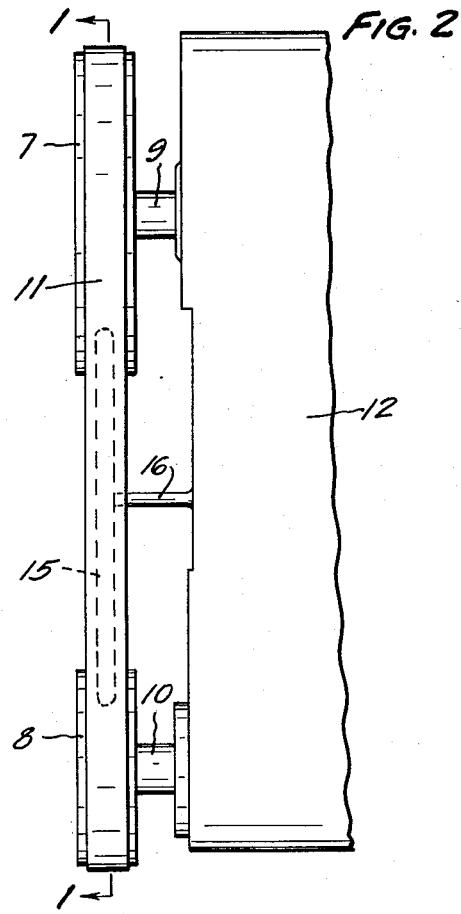
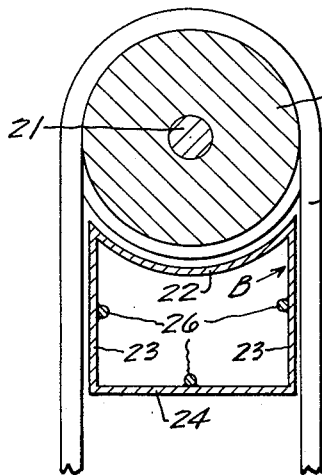
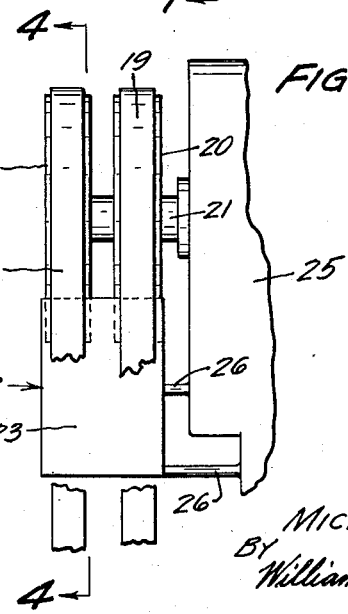
INVENTOR
MICHAEL H. PETERSON
BY Williamson & Williamson
ATTORNEYS Patented Aug. 19, 1952

2,607,241

UNITED STATES PATENT OFFICE 2,607,241

SAFETY GUARD FOR DRIVING CONNECTION MECHANISM

Michael H. Peterson, Swift, Minn., assignor of one-half to Andrew J. Landby, Swift, Minn.

Application March 21, 1949, Serial No. 82,622

1 Claim. (Cl. 74—611)

This invention relates to safety guards for driving connection mechanisms and particularly for rotary wheel and belt driving mechanisms.

It is an object of my invention to provide a novel and improved relatively simple safety guard adapted to be mounted in close association to opposed peripheral portions of the rotary wheels of a belt driving mechanism and in close association to the opposed interior portions of the belt runs of said mechanism to prevent articles from being carried around said wheels between the belt and the wheel periphery to be crushed thereby.

It is another object to provide a fixed safety guard having a pair of wheel guard elements curved to conform to portions of the wheel peripheries and having belt guard elements adapted to be mounted in close association to the interior opposed portions of the belt runs to prevent articles from being carried by either wheel peripheries or the interior belt portions into engagement between the belt and the wheel to be crushed thereby.

It is a further object to provide a safety guard adapted to be mounted between the spaced rotary wheels in close association to the opposed exposed portions thereof and the entire opposed portions of the belt runs to positively protect the entire danger area of a belt driving mechanism.

It is still a further object to provide a belt guard having a pair of elements adapted to be fixed adjacent the respective wheels in interposed relation therebetween and to extend along only a portion of the belt runs.

These and other objects and advantages of my invention will more fully appear from the following description made in connection with the accompanying drawings wherein like reference characters refer to similar parts throughout the several views and in which:

Fig. 1 is a vertical sectional view taken substantially along the line 1—1 of Fig. 2;

Fig. 2 is a side elevational view showing my improved safety guard as mounted on a typical belt driving mechanism;

Fig. 3 is a side elevational view of an alternative form of my belt guard as mounted on a double pulley belt driving mechanism; and Fig. 4 is a vertical sectional view taken substantially along the line 4—4 of Fig. 3.

As illustrated in Figs. 1 and 2 of the accompanying drawings, I provide a safety guard for belt drives. A typical belt drive mechanism is illustrated having a pair of rotary wheels, such as the pulleys 7 and 8 mounted on rotary shafts 9 and 10 respectively and spaced one from the other. A belt such as the V-belt 11 is trained about the two rotary pulleys 7 and 8 for interconnecting the same. Fig. 2 shows a typical supporting structure 12 in which the shafts 9 and 10 are bearinged.

Form A of my safety guard is illustrated in Figs. 1 and 2 and comprises an integral unit having end plates forming a pair of wheel guard elements 13 and 14 curved to conform to the respective peripheries of the wheels 7 and 8. The length of these guard elements 13 and 14 is determined by the exposed peripheral length of the respective pulley wheels disposed between the two runs or flights of the belt 11, and said length should be substantially co-extensive with said exposed peripheral length of the pulleys. A pair of side plates constituting straight belt guard elements 15 respectively interconnect the ends of wheel guard elements 13 and 14 to lie along the respective runs of the belt 11 disposed between the two wheels 7 and 8 and disposed in close association to only the inner opposed portions thereof. A pair of attachment brackets 16 are fixed to intermediate portions of the belt guard element 15 and extend inwardly therefrom to be attached in fixed relation to the supporting structure 12 as by being welded thereto, as best shown in Fig. 2.

Figs. 3 and 4 illustrate an alternative form of my invention designated by the letter B. A belt 17 is trained about a pulley 18, and a second belt 19 is trained about a pulley 20. Both pulleys 18 and 20 are mounted on a single shaft for rotation therewith and are disposed in spaced parallel relation. The shaft is designated by the numeral 21. Form B of my invention is formed from a single relatively wide box-like member of a width adapting it to extend laterally across the width of the two pulleys and belts, as best shown in Fig. 3. This box-like member has an end plate 22, side plates 23 and a second end plate 24. The end plate 22 is arcuate and inwardly bowed throughout its length to conform to the periphery of the pulley wheel and form a wheel guard element 22 adapted to be disposed in close association to the exposed peripheral portions of the pulley wheel. The side plates or belt guard portion 23 of the safety guard B extend only a part of the way along the two runs of the belts 17 and 19. The end plate or bar 24 interconnects the lower ends of the side plates or belt guard elements 23 to securely brace the same, and the safety guard B is fixed to the supporting structure 25 as by the attachment brackets 26. A similar guard B would then be placed adjacent the other pulleys (not shown) around which the belts 17 and 19 are trained to afford protection at that end of the belt runs.

It will be seen that I have provided a novel and extremely simple safety guard for belt driving mechanisms adapted to be mounted on only the critical inner opposed portions of the mechanism. Form A of the invention protects the entire inner opposed portions of the two pulley wheels while form B protects only the extremely critical end portions thereof and also is designed for a multiple pulley mechanism, as shown in Figs. 3 and 4. It should be noted that both safety guards A and B are extremely simple and inexpensive to manufacture and also have the decided advantage of permitting the driving belts to be changed without removing the safety guards themselves, which guards can be permanently fixed to the supporting structure, as shown in the drawings. Form B of the invention is particularly adapted for use where the belt runs are substantially longer than shown in form A and provides adequate protection for such mechanism.

It will, of course, be understood that various changes may be made in the form, details, arrangement and proportions of the parts without departing from the scope of my invention.

What I claim is:

For use with a rotatable pulley and a belt trained about the pulley and having flights spaced from each other by the pulley, a belt and pulley guard of dimensions adapting it to fit between the flights and adjacent the pulley and comprising sheet metal side plates and sheet metal end plates extending between the side plates and integrally connected to ends of the said side plates, and together therewith forming a box-like structure, the end plates being of a length adapting them to maintain the side plates in close and substantially parallel relation to the flights of the belt, one of the end plates being arcuate longitudinally for its full length and inwardly bowed for close fitting relation to the portion of the pulley exposed between flights of the belt, and mounting brackets rigidly connected with certain of said plates.

MICHAEL H. PETERSON.

REFERENCES CITED

The following references are of record in the file of this patent:

UNITED STATES PATENTS

| Number | Name | Date |
|---|---|---|
| 579,237 | Kotin | Mar. 23, 1897 |
| 583,144 | Farmer | May 25, 1897 |
| 613,637 | Bassett | Nov. 1, 1898 |
| 1,636,327 | Roe | July 19, 1927 |

FOREIGN PATENTS

| Number | Country | Date |
|---|---|---|
| 401,360 | France | Aug. 27, 1909 |